United States Patent
Chaudhry et al.

(10) Patent No.: US 6,862,693 B2
(45) Date of Patent: Mar. 1, 2005

(54) PROVIDING FAULT-TOLERANCE BY COMPARING ADDRESSES AND DATA FROM REDUNDANT PROCESSORS RUNNING IN LOCK-STEP

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 536 days.

(21) Appl. No.: 10/061,522

(22) Filed: Jan. 31, 2002

(65) Prior Publication Data

US 2002/0152420 A1 Oct. 17, 2002

Related U.S. Application Data

(60) Provisional application No. 60/283,598, filed on Apr. 13, 2001.

(51) Int. Cl.[7] .............................................. G06F 11/00
(52) U.S. Cl. .......................... 714/11; 714/12; 711/120; 711/122; 711/141
(58) Field of Search ............................ 714/11, 12, 723, 714/797; 711/122, 140, 141, 142, 120; 709/248, 400

(56) References Cited

U.S. PATENT DOCUMENTS

| | | | | |
|---|---|---|---|---|
| 4,456,952 A | | 6/1984 | Mohrman et al. | 364/200 |
| 4,868,851 A | * | 9/1989 | Trinidad et al. | 375/267 |
| 5,058,053 A | * | 10/1991 | Gillett | 710/317 |
| 5,226,152 A | * | 7/1993 | Klug et al. | 714/12 |
| 5,388,242 A | * | 2/1995 | Jewett | 711/113 |
| 5,623,449 A | * | 4/1997 | Fischer et al. | 315/200 R |
| 5,901,281 A | * | 5/1999 | Miyao et al. | 714/11 |
| 5,903,717 A | | 5/1999 | Wardrop | 395/182.1 |
| 2001/0034824 A1 | * | 10/2001 | Mukherjee et al. | 712/215 |

* cited by examiner

Primary Examiner—Robert Beausoliel
Assistant Examiner—Aaron D Matthew
(74) Attorney, Agent, or Firm—Park, Vaughan & Fleming LLP (57) ABSTRACT

One embodiment of the present invention provides a system that facilitates fault-tolerance by using redundant processors. This system operates by receiving store operations from a plurality of redundant processors running the same code in lockstep. The system compares the store operations to determine if the store operations are identical, thereby indicating that the redundant processors are operating correctly. If the store operations are identical, the system combines the store operations into a combined store operation, and forwards the combined store operation to a system memory that is shared between the redundant processors. If the store operations are not identical, the system indicates an error condition. In a variation on this embodiment, the system similarly combines store operations.

19 Claims, 9 Drawing Sheets

PROVIDING FAULT-TOLERANCE BY COMPARING ADDRESSES AND DATA FROM REDUNDANT PROCESSORS RUNNING IN LOCK-STEP

RELATED APPLICATIONS

This application hereby claims priority under 35 U.S.C. §119 to U.S. Provisional Patent Application No. 60/283,598, filed on Apr. 13, 2001, entitled "Providing Fault-Tolerance by Comparing Stores from Redundant Processors Running In Lock-Step", by inventors Shailender Chaudhry and Marc Tremblay.

BACKGROUND

1. Field of the Invention

The present invention relates to the design of multiprocessor systems. More specifically, the present invention relates to a method and an apparatus for facilitating fault-tolerance by comparing addresses and data from redundant processors running in lock-step.

2. Related Art

As microprocessor systems become increasingly faster and more complex, larger numbers of circuit elements are being pushed to run at faster and faster clock rates. This increases the likelihood that transient errors will occur during program execution, and thereby reduces the reliability of microprocessor systems.

Error-correcting codes can be employed to correct transient errors that occur when data is stored into memory. However, such error-correcting codes cannot correct all types of errors, and furthermore, the associated circuitry to detect and correct errors is impractical to deploy in extremely time-critical computational circuitry within a microprocessor.

Transient errors can also be detected and/or corrected by replicating a computer system so that there exist two or more copies of the computer system concurrently executing the same code. This allows transient errors to be detected by periodically comparing results produced by these replicated computer systems.

Transient errors can be corrected in a replicated computer system by voting. If there are three or more replicated computer systems and an error is detected, the computer systems can vote to determine which result is correct. For example, in a three-computer system, if two of the three computers produce the same result, this result is presumed to be the correct answer if the other computer system produces a different result.

However, replicating entire computer systems can be expensive, especially if the entire system memory has to be replicated.

What is needed is a method and an apparatus for providing fault-tolerance without replicating entire computer systems.

Another problem with using replicated (redundant) computer systems to provide fault-tolerance is that existing cache-coherence mechanisms can interfere with the task of keeping all of the replicated processors in the same state.

Figure 1A:
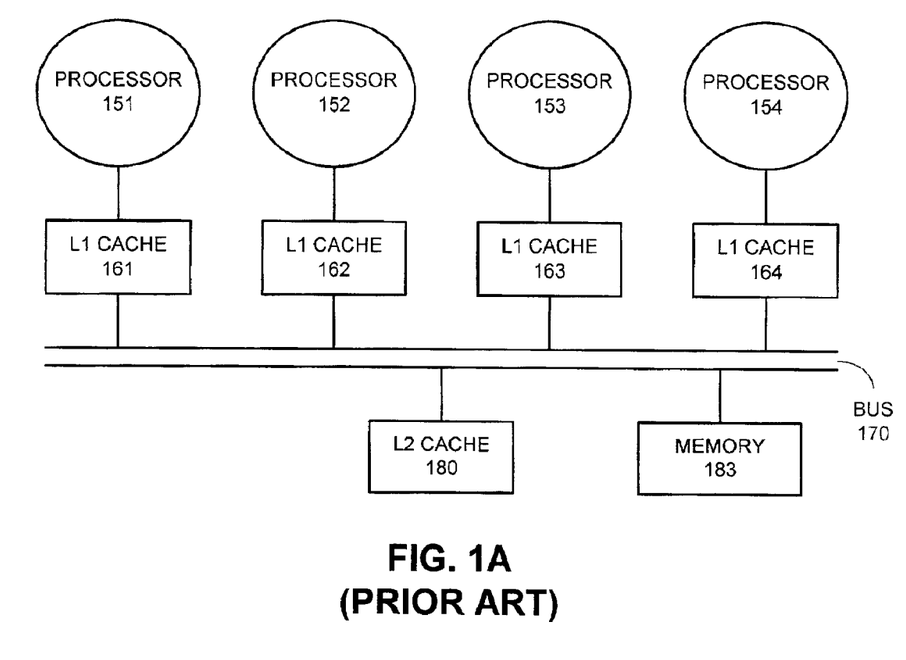
FIG. 1A illustrates a multiprocessor system.

For example, a common multiprocessor design includes a number of processors 151–154 with a number of level one (L1) caches, 161–164, that share a single level two (L2) cache 180 and a memory 183 (see FIG. 1). During operation, if a processor 151 accesses a data item that is not present in its local L1 cache 161, the system attempts to retrieve the data item from L2 cache 180. If the data item is not present in L2 cache 180, the system first retrieves the data item from memory 183 into L2 cache 180, and then from L2 cache 180 into L1 cache 161.

Note that coherence problems can arise if a copy of the same data item exists in more than one L1 cache. In this case, modifications to a first version of a data item in L1 cache 161 may cause the first version to be different than a second version of the data item in L1 cache 162.

In order to prevent such coherency problems, these computer systems typically provide a coherency protocol that operates across bus 170. A coherency protocol typically ensures that if one copy of a data item is modified in L1 cache 161, other copies of the same data item in L1 caches 162–164, in L2 cache 180 and in memory 183 are updated or invalidated to reflect the modification. This is accomplished by broadcasting an invalidation message across bus 170.

However, note that this type of coherency mechanism can cause replicated processors to have different states in their local L1 caches. For example, if a first replicated processor updates a data item in L1 cache, it may cause the same data item to be invalidated in the L1 cache of second replicated processor. In this case, the L1 cache of the first replicated processor ends up in a different state than the L1 cache of the second replicated processor.

What is needed is a method and an apparatus for providing fault-tolerance through replicated processors, without the side-effects caused by a cache-coherence mechanism.

SUMMARY

One embodiment of the present invention provides a system that facilitates fault-tolerance by using redundant processors. This system operates by receiving store operations from a plurality of redundant processors running the same code in lockstep. The system compares the store operations to determine if the store operations are identical, thereby indicating that the redundant processors are operating correctly. If the store operations are identical, the system combines the store operations into a combined store operation, and forwards the combined store operation to a system memory that is shared between the redundant processors. If the store operations are not identical, the system indicates an error condition.

In one embodiment of the present invention, handling the error condition involves setting an error flag in a data word for the combined store operation, and forwarding the combined store operation to the system memory.

In one embodiment of the present invention, in handling the error condition, the system determines whether a majority of store operations are identical. If so, the system combines the majority into a combined store operation, and forwards the combined store operation to the system memory. If no majority exists, the system sets an error flag in a data word for the combined store operation, and forwards the combined store operation to the system memory.

In one embodiment of the present invention, the system additionally receives load operations from the redundant processors. The system compares the load operations to determine if the load operations are identical, thereby indicating that the redundant processors are operating correctly. If the load operations are identical, the system combines the load operations into a combined load operation, and forwards the combined load operation to the system memory that is shared between the redundant processors. Next, the system receives a return data value from the system memory, and broadcasts the return data value to the redundant processors. If the load operations are not identical, the system indicates an error condition.

In a variation on this embodiment, the system receives the return data value at one of the redundant processors. This redundant processor examines an error flag in the return data value. If the error flag is set, the processor traps to an error handling routine.

In one embodiment of the present invention, system memory includes a lower-level cache memory.

In one embodiment of the present invention, the system additionally receives invalidation messages from the plurality of redundant processors. These invalidation messages indicate that a specific cache line should be invalidated. The system combines these invalidation messages into a combined invalidation message, and communicates the combined invalidation message to other processors in the computer system.

In one embodiment of the present invention, the system additionally receives an invalidation message indicating that a specific cache line should be invalidated. This invalidation message is generated as a result of actions of another processor that is not one of the redundant processors. The system broadcasts this invalidation message to the redundant processors.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Multiprocessor Systems

Figure 1B:
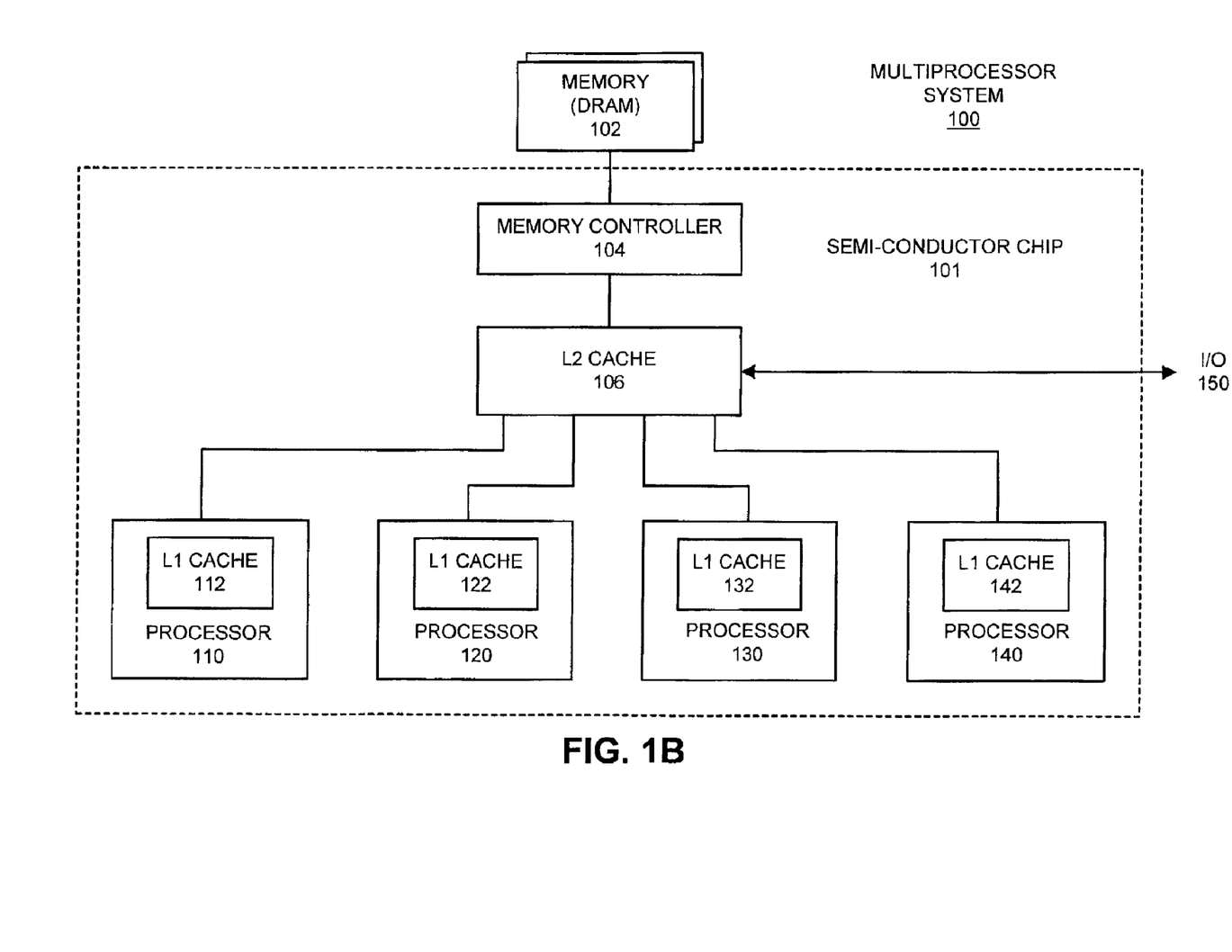
FIG. 1B illustrates a multiprocessor system in accordance with an embodiment of the present invention.

FIG. 1B illustrates a multiprocessor system 100 in accordance with an embodiment of the present invention. Note that most of multiprocessor system 100 is located within a single semiconductor chip 101. More specifically, semiconductor chip 101 includes a number of processors 110, 120, 130 and 140, which contain level one (L1) caches 112, 122, 132 and 142, respectively. Note that L1 caches 112, 122, 132 and 142 may be separate instruction and data caches, or alternatively, unified instruction/data caches. L1 caches 112, 122, 132 and 142 are coupled to level two (L2) cache 106. L2 cache 106 is coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data item from L2 cache 106 without having to wait for L1 cache 112 to source the data item. Moreover, no forwarding network is needed to allow L1 cache 112 to source the data. Note that in one embodiment of the present invention, L2 cache 106 is an "inclusive cache", which means that all items in L1 caches 112, 122, 132 and 142 are included in L2 cache 106.

Figure 2:
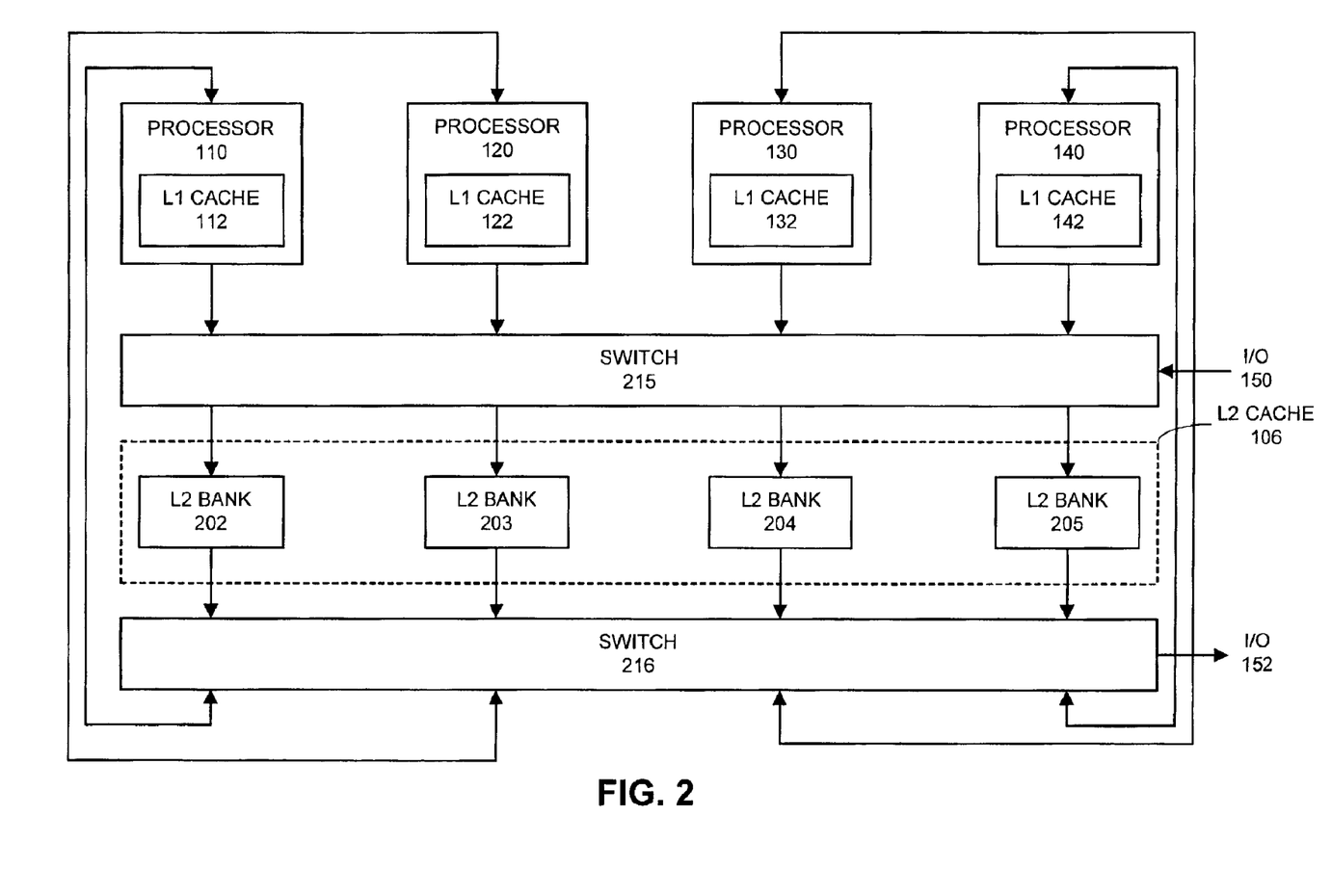
FIG. 2 illustrates in more detail the multiprocessor system illustrated in FIG. 1B in accordance with an embodiment of the present invention.

FIG. 2 illustrates in more detail the multiprocessor system illustrated in FIG. 1B in accordance with an embodiment of the present invention. In this embodiment, L2 cache 106 is implemented with four banks 202–205, which can be accessed in parallel by processors 110, 120, 130 and 140 through switches 215 and 216. Switch 215 handles communications that feed from processors 110, 120, 130 and 140 into L2 banks 202–205, while switch 216 handles communications in the reverse direction from L2 banks 202–205 to processors 110, 120, 130 and 140.

Note that only two bits of the address are required to determine which of the four banks 202–205 a memory request is directed to. Also note that switch 215 additionally includes an I/O port 150 for receiving communications from I/O devices, and switch 216 includes an I/O port 152 for sending communications to I/O devices.

Note that by using this "banked" architecture, it is possible to concurrently connect each L1 cache to its own bank of L2 cache, thereby increasing the bandwidth of L2 cache 106.

Switch

Figure 3:
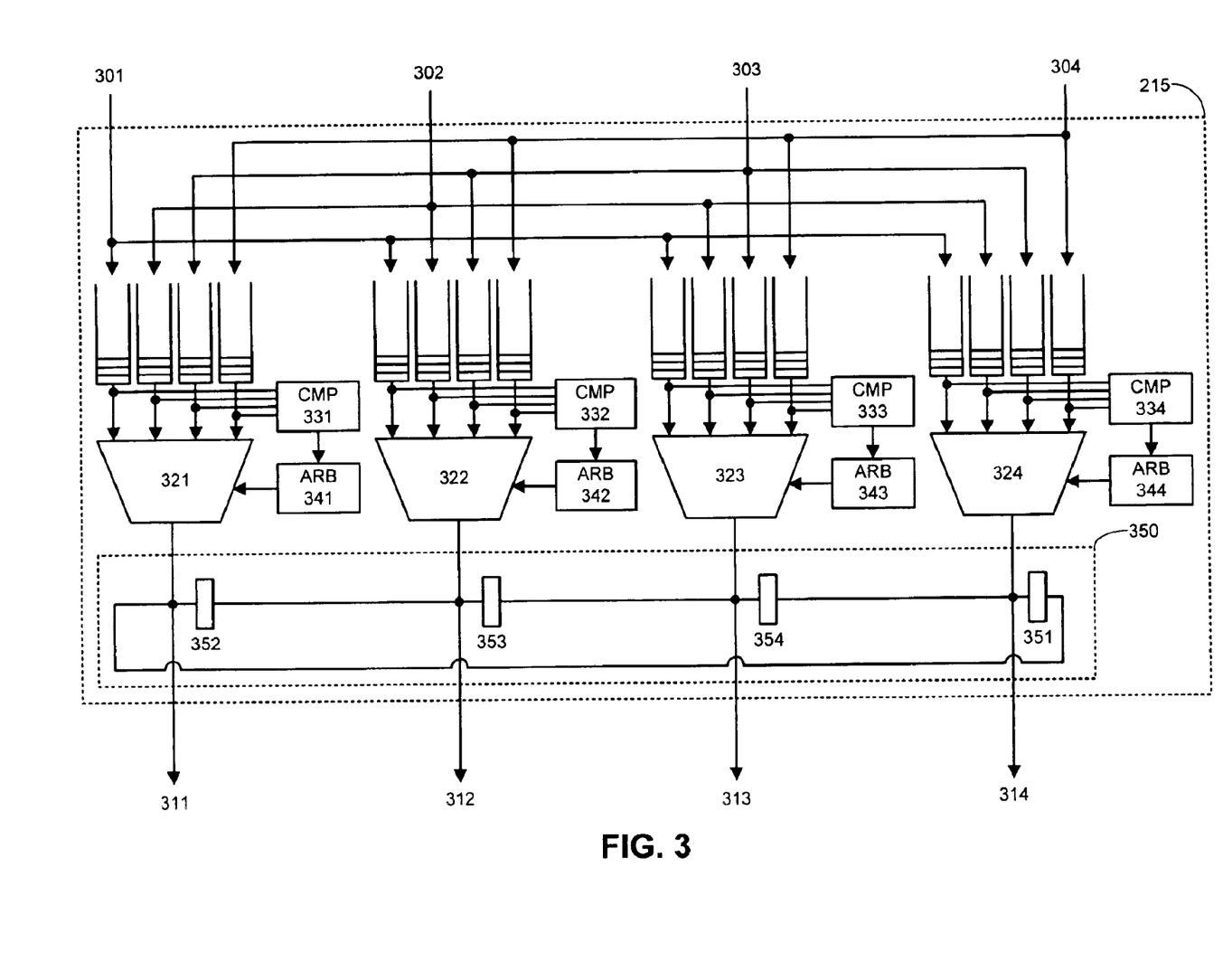
FIG. 3 illustrates the structure of a switch in accordance with an embodiment of the present invention.

FIG. 3 illustrates the structure of a switch 215 in accordance with an embodiment of the present invention. Switch 215 includes a number of inputs 301–304, which are coupled to processors 110, 120, 130 and 140, respectively. Switch 215 also includes a number of outputs 311–314, which are coupled to L2 banks 202–205, respectively. Note that each of these inputs 301–304 and outputs 311–314 represents multiple data lines.

Figure 4A:
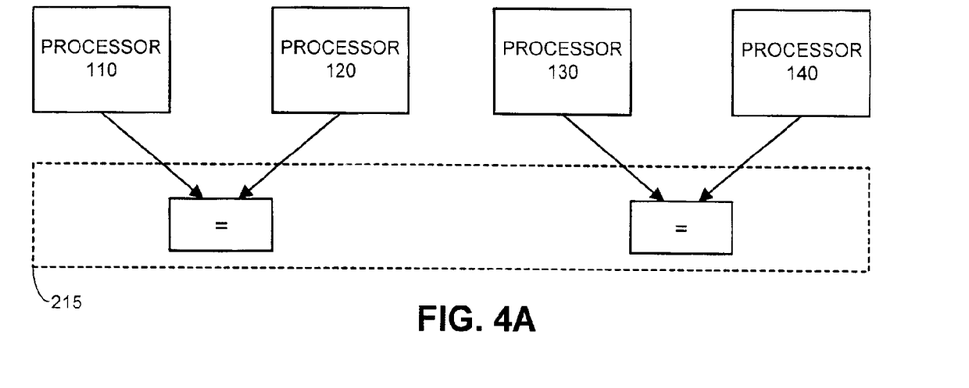
FIG. 4A illustrates a duplex configuration of a multiprocessor system in accordance with an embodiment of the present invention.
Figure 4B:
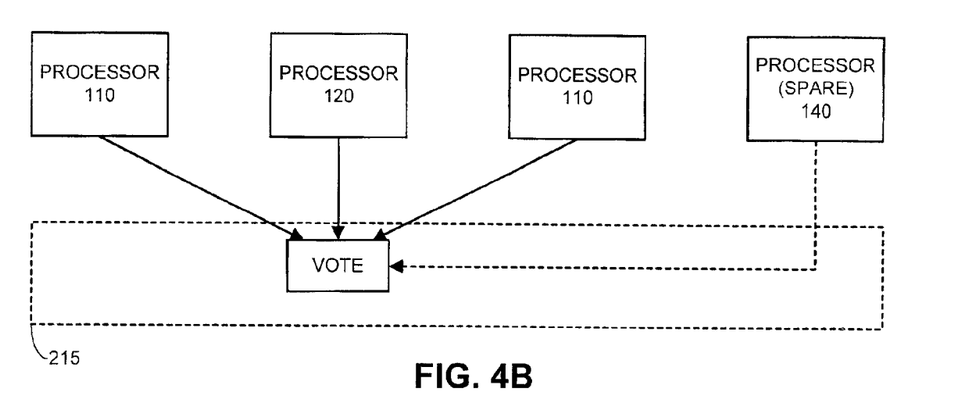
FIG. 4B illustrates a triple modular redundancy (TMR) configuration of a multiprocessor system in accordance with an embodiment of the present invention.

Within switch 215 there are a number of multiplexers 321–324. Each of these multiplexers 321–324 has an input queue for each of the inputs 301–304. For example, multiplexer 321 is coupled to four queues, each one of which is coupled to one of the inputs 301–304. Comparator 331 performs comparison operations between values stored in the input queues to facilitate fault tolerance. In the system configuration illustrated in FIG. 4A, comparator 331 compares pairs of inputs 301–302 and 303–304. In another configuration illustrated in FIG. 4B, comparator circuit facilitates voting between three or more inputs 301–304 to determine if a majority of the inputs match.

The output of comparator 331 feeds into arbitration circuit 341. Arbitration circuit 341 causes an entry from one of the input queues to be routed to output 311 through multiplexer 321.

The outputs of multiplexers 321–324 pass into broadcast switch 350. Broadcast switch 350 includes a number of pass gates 351–354, which can selectively couple an output of a multiplexer to a neighboring output. For example, if pass gate 352 is transparent and the output of multiplexer 322 is disabled, the output of multiplexer 321 is broadcast onto outputs 311 and 312. Note that in general there are many possible ways to implement broadcast switch 350. The only requirement is that broadcast switch 350 should be able to broadcast the output of any one of multiplexers 321–324 to multiple outputs 311–314.

Note that the structure of switch 216 is identical to the structure of switch 215 except that inputs 301–304 are coupled to L2 banks 202–205, respectively, and the outputs 311–314 are coupled to processors 110, 120, 130 and 140, respectively.

Configurations

FIG. 4A illustrates a duplex configuration of a multiprocessor system in accordance with an embodiment of the present invention. In this configuration, processors 110 and 120 form a pair of redundant processors that execute the same code in lockstep. Store operations through switch 215 are compared to ensure that data values and store addresses from processors 110 and 120 agree. Load operations through switch 215 are similarly compared to ensure that the load addresses agree. If not, an error is indicated. Similarly, processors 130 and 140 form another pair of redundant processors, and switch 215 compares store operations from these processors.

The configuration illustrated in FIG. 4A is achieved by initializing processors 110 and 120 to run the same code in lockstep, and by initializing processors 130 and 140 to run the same code in lockstep. Within combining switch 215, comparators 331–334 are configured so that inputs 301 and 302 are always compared against each other and inputs 303–304 are always compared against each other.

Within broadcast switch 216, the output of comparators 332 and 334 are disabled and pass gates 352 and 354 are made transparent. This ensures that the output of multiplexer 321 is broadcast to outputs 311 and 312, which are coupled to processors 110 and 120. It also ensures that the output of multiplexer 323 is broadcast to outputs 313 and 314, which are coupled to processors 130 and 140.

FIG. 4B illustrates a triple modular redundancy (TMR) configuration of a multiprocessor system in accordance with an embodiment of the present invention. In this configuration, processors 110, 120 and 130 execute the same code in lockstep, and processor 140 is a spare processor (which may also be executing the same code in lockstep to facilitate rapid replacement).

Store operations generated by processors 110, 120 and 130 are compared at switch 215. If they do not agree, the system performs a voting operation to determine if two of the three store operations agree. If so, the store operations that agree are taken to be the correct store operation, and the other store operation is presumed to be erroneous and is ignored.

The configuration illustrated in FIG. 4B is achieved by initializing processors 110, 120 and 130 to run the same code in lockstep. Within combining switch 215, comparators 331–334 are configured so that inputs 301–303 are always compared against each other, and so that the majority wins. Within broadcast switch 216, the output of comparators 332–334 are disabled and pass gates 352 and 353 are made transparent. This ensures that the output of multiplexer 321 is broadcast to outputs 311–313, which are coupled to processors 110, 120 and 130, respectively.

Note that one embodiment of the present invention can be selectively reconfigured between the configuration illustrated in FIG. 4A and the configuration illustrated in FIG. 4B during a system boot operation.

Store Operation

Figure 5:
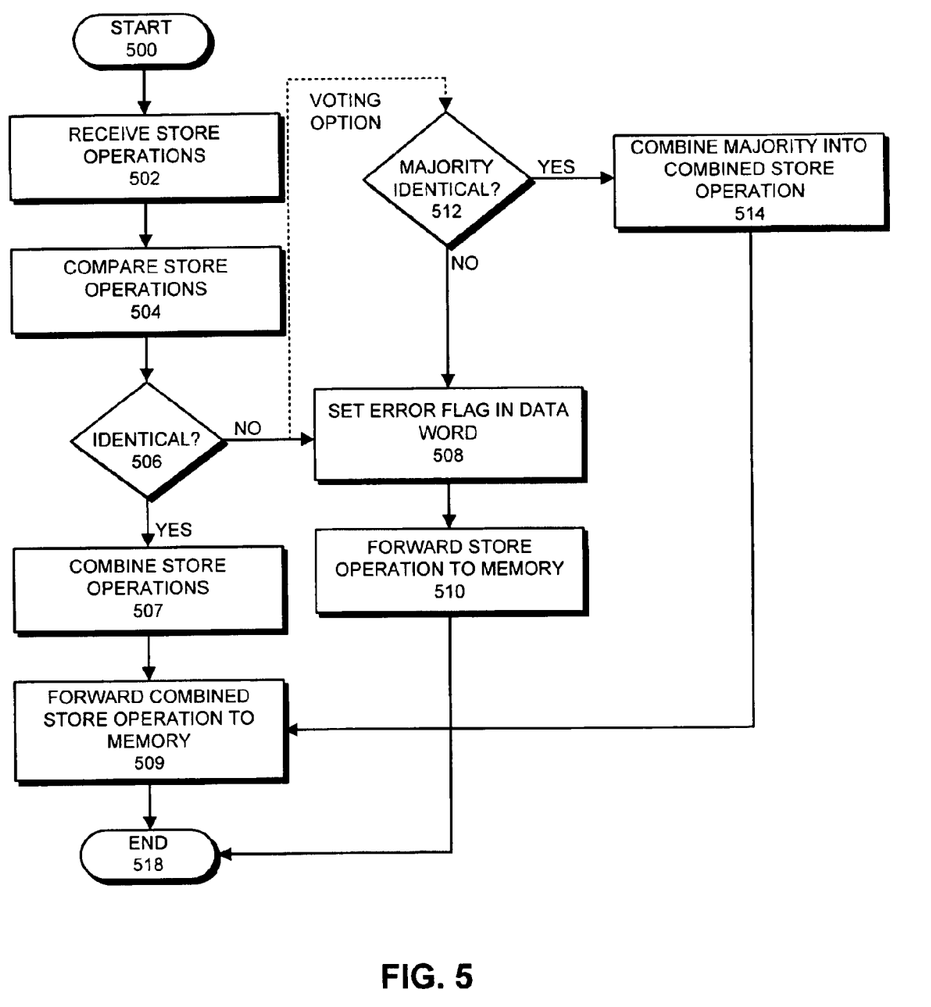
FIG. 5 is a flow chart illustrating a store operation in accordance with an embodiment of the present invention.

FIG. 5 is a flow chart illustrating a store operation in accordance with an embodiment of the present invention. The system starts when switch 215 receives store operations from redundant processors running in lock step (step 502). The system compares these store operations by using one of comparators 331–334 (step 504). If these store operations are identical, the processors are presumably operating properly. In this case, the system combines the store operations into a single store operation (step 507), and forwards the combined store operation to system memory (or L2 cache) (step 509). Note that combining store operations involves passing only one instance of the store operation to switch 215 and ignoring the other instances.

If the store operations are not identical, the system sets an error flag in the data word for the store operation (step 508), and forwards the store operation to system memory (step 510). Note that if there is an error, it does not matter what the data value of the store operation is set to. The system only has to ensure that the error flag is set.

If the store operations are not identical and the system is configured for the voting option, such as in the TMR configuration illustrated in FIG. 4B, the system determines whether a majority of the store operations are identical (step 512). If not, the system sets an error flag in the data word for the store operation (step 508), and forwards the store operation to memory (step 510).

If a majority if the store operations are identical, the system combines the majority into a combined store operation (by ignoring all but one instance of the identical store operations) (step 514), and forwards the combined store operation to memory (step 509).

Load Operation

Figure 6:
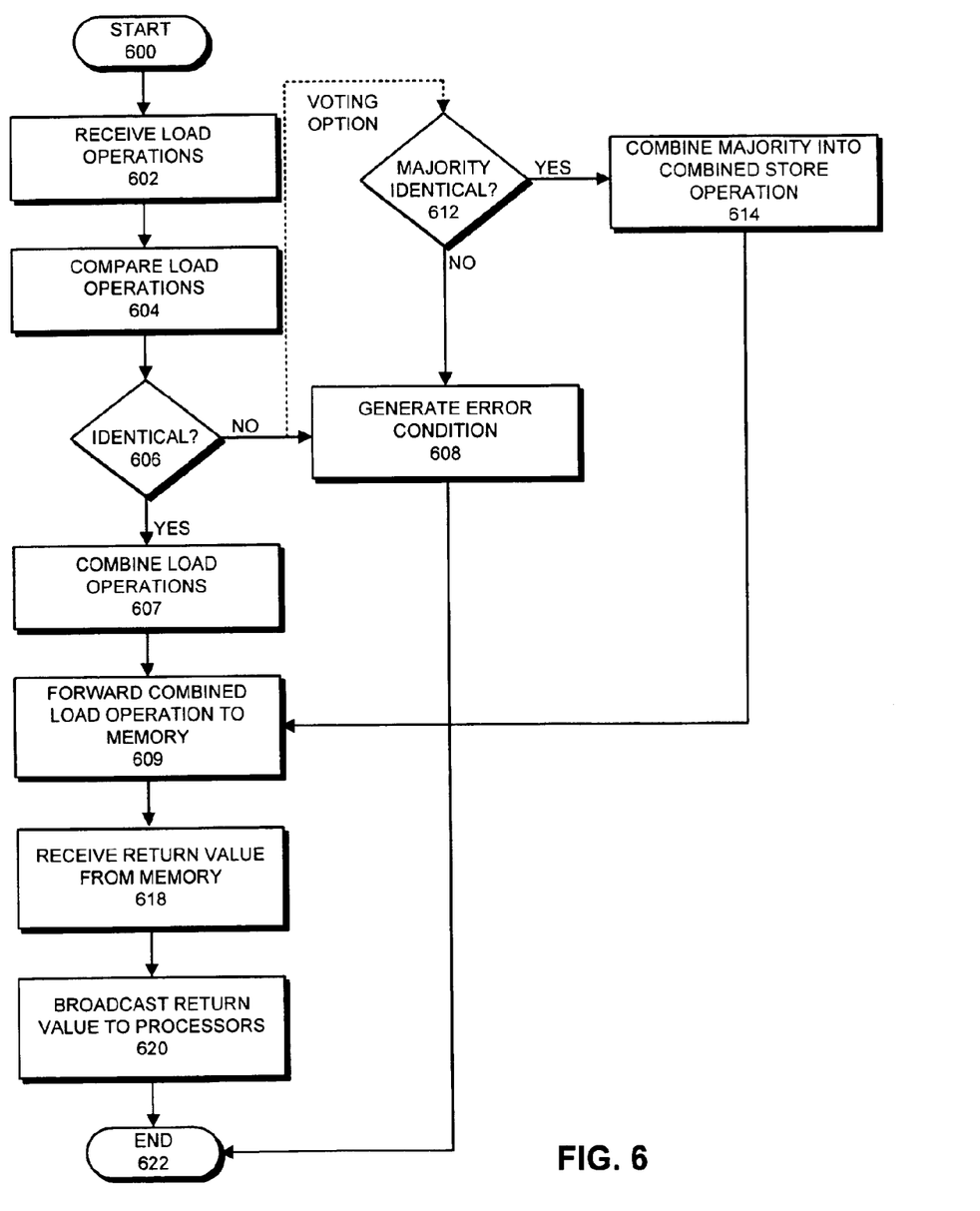
FIG. 6 is a flow chart illustrating a load operation in accordance with an embodiment of the present invention.

FIG. 6 is a flow chart illustrating a load operation in accordance with an embodiment of the present invention. The system starts when switch 215 receives load operations from redundant processors running in lock step (step 602). The system compares these load operations by using one of comparators 331–334 (step 604). If these load operations are identical, the processors are presumably operating properly. In this case, the system combines the load operations into a single load operation (step 607), and forwards the combined load operation to system memory (or L2 cache) (step 609). Note that combining load operations involves passing only one instance of the load operation to switch 215 and ignoring the other instances.

If the load operations are not identical and the system is configured for the voting option, such as in the TMR configuration illustrated in FIG. 4B, the system determines whether a majority of the load operations are identical (step 612). If not, the system sets generates an error condition (step 608).

If a majority if the load operations are identical, the system combines the majority into a combined load operation (by ignoring all but one instance of the identical load operations) (step 614), and forwards the combined load operation to memory (step 609).

Next, switch 216 receives a return value for the load operation from system memory (step 618). Switch 216 uses pass gates 351–354 to broadcast the return value to the redundant processors (step 620).

Figure 9:
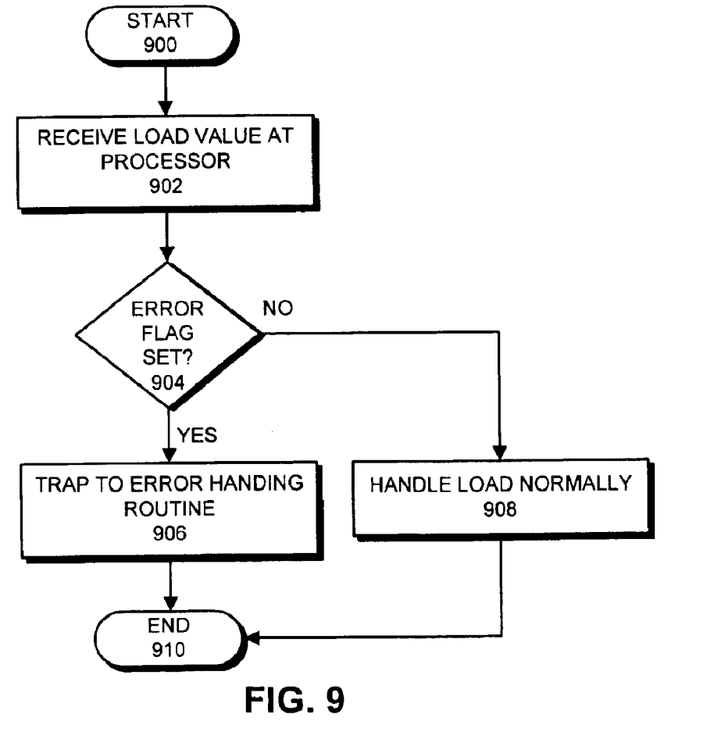
FIG. 9 is a flow chart illustrating the process of handling a load value with an error set in accordance with an embodiment of the present invention.

Referring to FIG. 9, when a load operation is received at one of the redundant processors (step 902), the processor checks the error flag (step 904). If the error flag is set, the processor traps to an error handling routine (step 906). Otherwise, the processor handles the load normally (step 908).

Invalidation Operations

Note that the system illustrated in FIG. 3 applies cache coherency memory references after stores are combined within switch 215, and up to the point that return values from loads are broadcast by switch 216. Cache coherency does not apply prior to the stores being combined or after the return values are broadcast.

Figure 7:
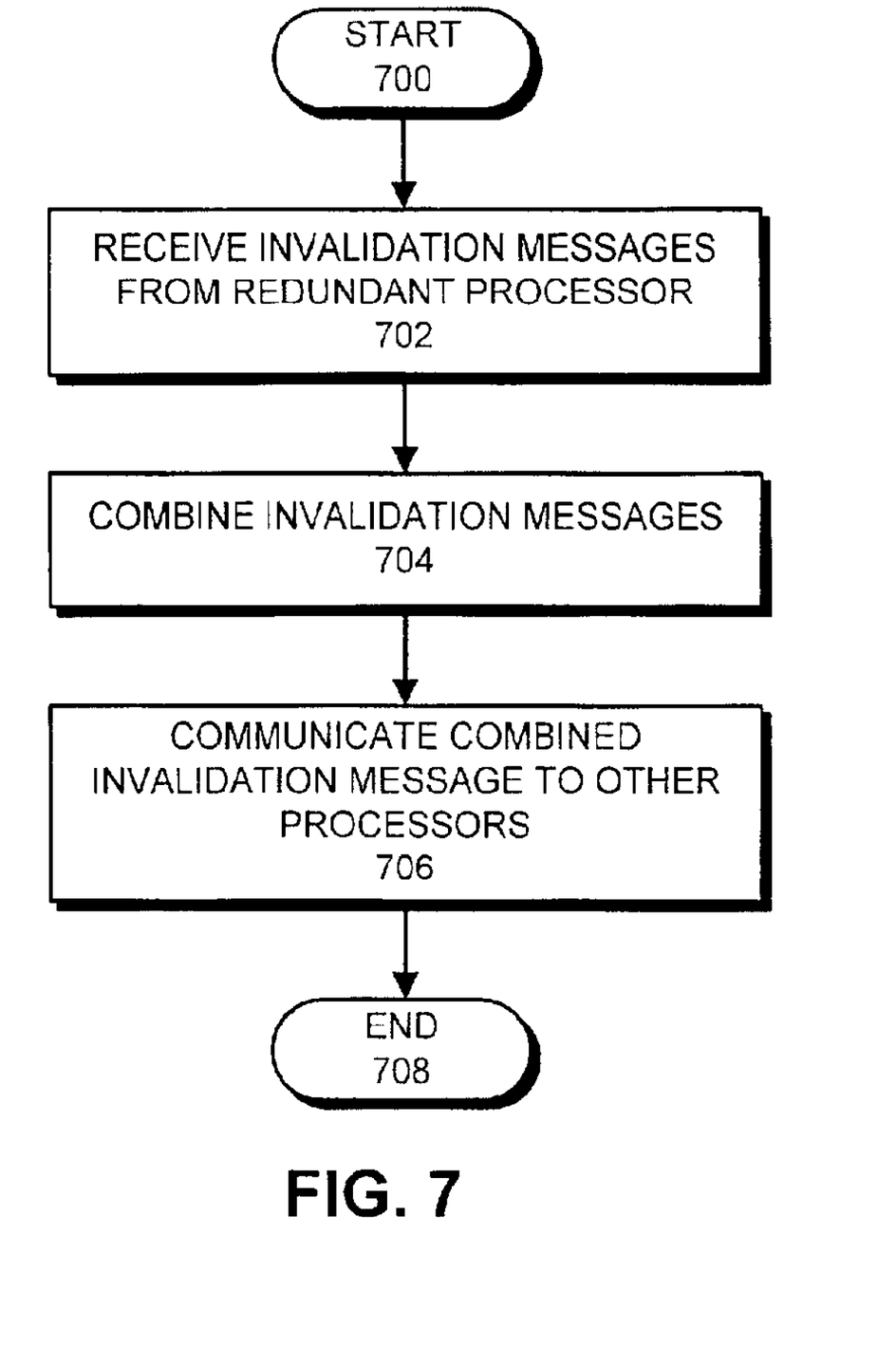
FIG. 7 is a flow chart illustrating the process of sending an invalidation operation in accordance with an embodiment of the present invention.

FIG. 7 is a flow chart illustrating the process of sending an invalidation operation to support cache coherence in accordance with an embodiment of the present invention. In this case, switch 215 receives multiple invalidation messages from redundant processors executing the same code (step 702). These invalidation messages are identical, and they indicate that a data item is updated in the local caches of the redundant processors. Switch 215 combines these invalidation messages into a combined invalidation message (step 704), which can be accomplished by ignoring all but one of the invalidation messages. This combined invalidation message is then sent to other processors in the computer system, but not to any of the redundant processors that sent the invalidation message (step 706).

For example, in FIG. 4A, if processors 110 and 120 concurrently generate invalidation messages, these invalidation messages are combined into a single invalidation message in switch 215. This single invalidation message is then sent to processors 130 and 140 through switch 216.

Figure 8:
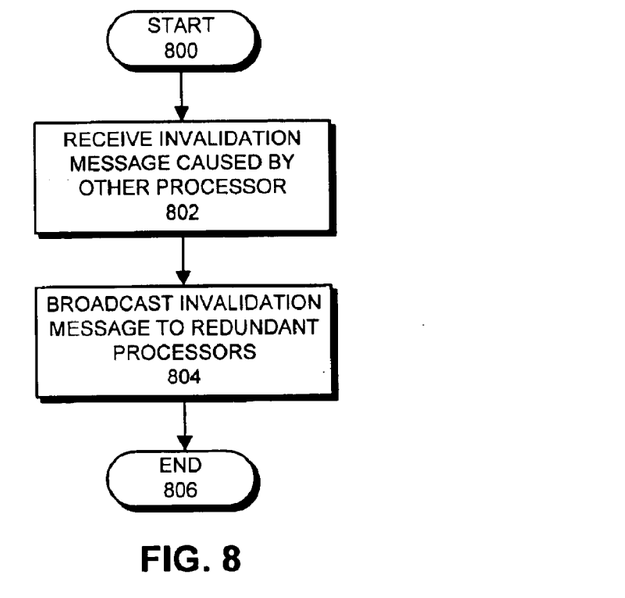
FIG. 8 is a flow chart illustrating the process of receiving an invalidation operation in accordance with an embodiment of the present invention.

FIG. 8 is a flow chart illustrating the process of receiving an invalidation operation in accordance with an embodiment of the present invention. In this case, switch 216 receives an invalidation message caused by a processor that is not part of the set of redundant processors (step 802). Switch 216 then broadcasts the invalidation message to the set of redundant processors (step 804).

For example, in FIG. 4A, when switch 216 receives a single invalidation message generated by redundant processors 110 and 120. Switch 216 broadcasts this invalidation message to processors 130 and 140. In this case, the same cache line is invalidated in both processor caches, thereby keeping the state within processors 130 and 140 identical.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing fault-tolerance by using redundant processors, comprising:

receiving a plurality of store operations from a plurality of redundant processors running the same code in lockstep;

comparing the plurality of store operations to determine if the plurality of store operations are identical, thereby indicating that the plurality of redundant processors are operating correctly;

if the plurality of store operations are not identical, indicating an error condition;

if the plurality of store operations are identical,
  combining the plurality of store operations into a combined store operation, and
  forwarding the combined store operation to a system memory that is shared between the plurality of redundant processors;

receiving a plurality of invalidation messages from the plurality of redundant processors;

wherein the plurality of invalidation messages indicate that a specific cache line should be invalidated in other caches in the computer system;

combining the plurality of invalidation messages into a combined invalidation message; and communicating the combined invalidation message to the other processors in the computer system, but not to the plurality of redundant processors.

2. The method of claim 1, wherein handling the error condition involves:

setting an error flag in a data word for the combined store operation; and
forwarding the combined store operation to the system memory.

3. The method of claim 1, wherein handling the error condition involves:

determining whether a majority of the plurality of store operations are identical;

if the majority of the plurality of store operations are identical,
  combining the majority into the combined store operation, and
  forwarding the combined store operation to the system memory; and if no majority exists,
  setting an error flag in a data word for the combined store operation, and
  forwarding the combined store operation to the system memory.

4. The method of claim 1, further comprising:

receiving a plurality of load operations from the plurality of redundant processors;

comparing the plurality of load operations to determine if the plurality of load operations are identical, thereby indicating that the plurality of redundant processors are operating correctly;

if the plurality of load operations are not identical, indicating an error condition; and if the plurality of load operations are identical,
  combining the plurality of load operations into a combined load operation;
  sending the combined load operation to the system memory;
  receiving a return data value from the system memory; and
  broadcasting the return data value to the plurality of redundant processors.

5. The method of claim 4, further comprising:

receiving the return data value at one of the plurality of redundant processors;

examining an error flag in the return data value; and if the error flag is set, trapping to an error handling routine.

6. The method of claim 1, wherein the system memory includes a lower-level cache memory.

7. The method of claim 1, further comprising:

receiving an invalidation message indicating that a specific cache line should be invalidated;

wherein the invalidation message is generated as a result of actions of another processor that is not one of the plurality of redundant processors; and broadcasting the invalidation message to all of the plurality of redundant processors.

8. An apparatus for providing fault-tolerance by using redundant processors, comprising:

a plurality of redundant processors that are configured to run the same code in lockstep;

a system memory that is shared between the plurality of redundant processors;

a switch that couples the plurality of redundant processors to the system memory, wherein the switch is configured to receive a plurality of store operations from the plurality of redundant processors;

a comparison mechanism within the switch that is configured to compare the plurality of store operations to determine if the plurality of store operations are identical, thereby indicating that the plurality of redundant processors are operating correctly;

a forwarding mechanism coupled to the comparison mechanism, wherein if the plurality of store operations are identical, the forwarding mechanism is configured to, combine the plurality of store operations into a combined store operation, and to forward the combined store operation to the system memory; and an error handling mechanism that is configured to indicate an error condition if the plurality of store operations are not identical;

wherein the switch is additionally configured to:

receive a plurality of invalidation messages from the plurality of redundant processors, wherein the plurality of invalidation messages indicate that a specific cache line should be invalidated in other processors in a computer system containing the plurality of redundant processors;

combine the plurality of invalidation messages into a combined invalidation message, and to communicate the combined invalidation message to the other processors in the computer system, but not to the plurality of redundant processors.

9. The apparatus of claim 8, wherein the error handling mechanism is configured to:

set an error flag in a data word for the combined store operation; and to forward the combined store operation to the system memory.

10. The apparatus of claim 8, wherein the error handling mechanism is configured to:

determine whether a majority of the plurality of store operations are identical;

wherein if the majority of the plurality of store operations are identical, the error handling mechanism is configured to, combine the majority into the combined store operation, and to forward the combined store operation to the system memory; and wherein if no majority exists, the error handling mechanism is configured to, set an error flag in a data word for the combined store operation, and to forward the combined store operation to the system memory.

11. The apparatus of claim 8, wherein the switch is additionally configured to:

receive a plurality of load operations from the plurality of redundant processors;

compare the plurality of load operations to determine if the plurality of load operations are identical, thereby indicating that the plurality of redundant processors are operating correctly;

if the plurality of load operations are not identical, to indicate an error condition; and if the plurality of load operations are identical, to combine the plurality of load operations into a combined load operation;

send the combined load operation to the system memory;

receive a return data value from the system memory; and to broadcast the return data value to the plurality of redundant processors.

12. The apparatus of claim 11, wherein each of the plurality of redundant processors is configured to:

receive the return data value;

examine an error flag in the return data value; and to trap to an error handling routine if the error flag is set.

13. The apparatus of claim 8, wherein the system memory includes a lower-level cache memory.

14. The apparatus of claim 8, wherein the switch is additionally configured to:

receive an invalidation message indicating that a specific cache line should be invalidated, wherein the invalidation message is generated as a result of actions of another processor that is not one of the plurality of redundant processors; and to broadcast the invalidation message to all of the plurality of redundant processors.

15. The apparatus of claim 8, wherein the switch includes:

a first uni-directional switch for communicating from the plurality of redundant processors to the system memory; and a second uni-directional switch for communicating from the system memory to the plurality of redundant processors.

16. An apparatus for providing fault-tolerance by using redundant processors, comprising:

a plurality of redundant processors that are configured to run the same code in lockstep;

a system memory that is shared between the plurality of redundant processors, wherein the system memory includes a lower-level cache memory;

a switch that couples the plurality of redundant processors to the system memory, wherein the switch is configured to receive a plurality of store operations from the plurality of redundant processors;

a comparison mechanism within the switch that is configured to compare the plurality of store operations to determine if the plurality of store operations are identical, thereby indicating that the plurality of redundant processors are operating correctly;

a forwarding mechanism coupled to the comparison mechanism, wherein if the plurality of store operations are identical, the forwarding mechanism is configured to,
combine the plurality of store operations into a combined store operation, and to
forward the combined store operation to the system memory; and an error handling mechanism that is configured to indicate an error condition if the plurality of store operations are not identical;

wherein the switch is additionally configured to,
receive a plurality of invalidation messages from the plurality of redundant processors, wherein the plurality of invalidation messages indicate that a specific cache line should be invalidated in other processors in a computer system containing the plurality of redundant processors,
combine the plurality of invalidation messages into a combined invalidation message, and to
communicate the combined invalidation message to the other processors in the computer system, but not to the plurality of redundant processors.

17. The apparatus of claim 16, wherein the error handling mechanism is configured to:
set an error flag in a data word for the combined store operation; and to
forward the combined store operation to the system memory.

18. The apparatus of claim 16, wherein the error handling mechanism is configured to:
determine whether a majority of the plurality of store operations are identical;
wherein if the majority of the plurality of store operations are identical, the error handling mechanism is configured to,
combine the majority into the combined store operation, and to
forward the combined store operation to the system memory; and
wherein if no majority exists, the error handling mechanism is configured to,
set an error flag in a data word for the combined store operation, and to
forward the combined store operation to the system memory.

19. The apparatus of claim 16, wherein the switch is additionally configured to:
receive a plurality of load operations from the plurality of redundant processors;
compare the plurality of load operations to determine if the plurality of load operations are identical, thereby indicating that the plurality of redundant processors are operating correctly;
if the plurality of load operations are not identical, to indicate an error condition; and
if the plurality of load operations are identical, to
combine the plurality of load operations into a combined load operation;
send the combined load operation to the system memory;
receive a return data value from the system memory; and to
broadcast the return data value to the plurality of redundant processors.

* * * * *